United States Patent [19]

McDonald

[11] Patent Number: 5,403,441

[45] Date of Patent: Apr. 4, 1995

[54] METHOD FOR CONTROLLING AN OZONE BLEACHING PROCESS

[75] Inventor: George W. McDonald, Pennington, N.J.

[73] Assignee: Union Camp Patent Holding, Inc., Wayne, N.J.

[21] Appl. No.: 976,082

[22] Filed: Nov. 13, 1992

[51] Int. Cl.⁶ .................. D21C 9/153; D21C 11/06; D21C 7/12

[52] U.S. Cl. ........................................ 162/38; 162/49; 162/62; 162/65

[58] Field of Search .................. 162/65, 62, 49, 238, 162/DIG. 10, 37, 38, 39

[56] References Cited

U.S. PATENT DOCUMENTS

| | | |
|---|---|---|
| 3,607,623 | 9/1971 | Chappelle . |
| 3,617,717 | 11/1971 | Smith . |
| 3,650,890 | 3/1972 | Kamio . |
| 4,278,496 | 7/1981 | Fritzvold . |
| 4,279,694 | 7/1981 | Fritzvold ............... 162/65 |
| 4,348,256 | 9/1982 | Bergstrom et al. . |
| 4,399,292 | 8/1983 | Rossi et al. ............ 95/175 |
| 4,840,703 | 6/1989 | Malmsten . |
| 4,978,425 | 12/1990 | Beller et al. . |

FOREIGN PATENT DOCUMENTS

| | | |
|---|---|---|
| 2067844 | 11/1992 | Canada . |
| 0047655A1 | 3/1982 | European Pat. Off. . |
| 158591 | 11/1972 | New Zealand . |
| 175906 | 7/1977 | New Zealand . |
| 194036 | 11/1983 | New Zealand . |
| 232530 | 7/1992 | New Zealand . |

OTHER PUBLICATIONS

Liebergott et al., "O₂, O₃ & Peroxide", 1978, Pulping & Bleaching Seminar, New Orleans, 1978.

Singh, "Computer Control", *The Bleaching of Pulp*, TAPPI Press, 1979, pp. 503–513.

Tritschler et al, "Commerical Manufacture and Industrial Use of Ozone as an Oxidant".

K. H. Ferguson, "Union Camp Begins Ozone Era with New Kraft Bleaching Line at Franklin, Va.," Nov. 1992, pp. 42–55, *Pulp & Paper*.

F. G. Shinsky, *Process Control Systems—Application, Design, and Tuning*, Third Edition, pp. 4–7, 10–11, 14–15, 18–19, 42–43, 120–121, 1988, McGraw-Hill, Inc.

*Primary Examiner*—Steve Alvo
*Attorney, Agent, or Firm*—Nath, Amberly & Associates

[57] ABSTRACT

A method for controlling the gas recycle loop of an ozone bleaching process wherein an ozone generator produces an ozone containing gas from an oxygen containing feed gas and delivers the ozone containing gas to an ozone reactor at a variable flow rate responsive to reactor ozone demand. Pulp is bleached with the ozone containing gas, thereby producing an exhaust gas having a flow rate that varies in response to the flow rate of the ozone containing gas delivered to the ozone reactor. The exhaust gas is then recovered and its flow rate is modified within the recycle loop so that an amount equivalent to reactor ozone demand is returned to the ozone generators. The oxygen content of the oxygen containing feed gas is monitored at or near the inlet of the ozone generator and an amount of fresh oxygen is supplied to the oxygen containing feed gas to obtain a predetermined level of oxygen therein. Additionally, an amount of exhaust gas may be purged at a rate substantially equivalent to the rate fresh oxygen is supplied. However, the pressure at the ozone generator is also monitored and the purge rate is adjusted in order to maintain constant pressure at the ozone generator.

20 Claims, 6 Drawing Sheets

FIG. 3A
△ = COMPRESSOR FLOW
⊙ = REACTOR FLOW
☐ = BYPASS FLOW

FIG. 6A GENERATOR PRESSURE

FIG. 6B
○ = PURGE FLOW (10⁻³)
□ = OXYGEN FLOW (10⁻³)

METHOD FOR CONTROLLING AN OZONE BLEACHING PROCESS

TECHNICAL FIELD

The present invention relates to the pulp and paper industry and, more particularly, to a method for controlling the ozone gas recycle loop of a process for ozone bleaching wood pulp.

BACKGROUND OF THE INVENTION

In a typical ozone bleaching process, pulp and an ozone containing gas are fed into an ozone reactor wherein they react to bleach the pulp and produce an exhaust gas. The amount of ozone required by the reactor is dependent on various factors such as in-going pulp brightness, production rate and target K No. or brightness.

Precise application of ozone on pulp is critical for maintaining bleaching performance. The extent of bleaching is directly proportional to the amount of ozone applied. Too little ozone results in a darker than desired pulp, while too much causes over-bleaching and a reduction in pulp strength. Short term variability of the incoming pulp results in rapidly changing optimum ozone application levels, which necessitates rapid flow system response to changes in ozone demand. Therefore, the over-riding control constraint of any ozone bleaching process is to precisely match ozone production and application to the incoming pulp brightness or K No. and tonnage.

A commercially suitable process for controlling the flow of ozone gas into a reactor is disclosed in commonly-assigned, copending U.S. application Ser. No. 07/604,849, now U.S. Pat. No. 5,181,989, to White et al., entitled "Pulp Bleaching Reactor and Method." In that application, an apparatus and method for delignifying and bleaching a lignocellulosic pulp without the use of elemental chlorine is disclosed. The bleaching reactor is a horizontal vessel having a central rotatable shaft which preferably contains paddles, cut and folded screw flights or a ribbon flight, to disperse and advance the pulp particles in a plug flow manner while contacting and mixing the pulp particles with a gaseous bleaching agent such as ozone for substantially uniform bleaching thereof.

After ozone containing gas has reacted in an ozone reactor, it is economically desirable to recycle the spent gas due to the relatively high cost of pure oxygen. When the spent gas is recycled, various contaminants must be removed from the recycle stream to maintain efficiency in the ozone generation process. A system for removing contaminants, including carbon dioxide, from an ozone generation recycle stream is disclosed in commonly-assigned copending U.S. application Ser. No. 07/739,050, to Joseph et al., filed Aug. 1, 1991, entitled, "Process and Apparatus for Conditioning Ozone Gas Recycle Stream in Ozone Pulp Bleaching." In that system, carbon dioxide and other contaminants are removed in amounts sufficient to prevent build-up in the ozone recycle stream of a pulp bleaching process providing the advantage of maintaining a higher ozone generation efficiency and reducing the overall cost of operating such a system.

In a recycling loop of the type described above, exhaust gas containing oxygen, carbon dioxide, water, residual ozone, hydrocarbons and carbon monoxide, is maintained at a predetermined pressure by a compressor. The exhaust gas is then recycled in a gas destruct loop where carbon monoxide and hydrocarbons are removed. The recycled gas is then refrigerated and dried to remove all water. Oxygen is then added to bring the gas to the desired composition and the gas is then fed into ozone generators wherein the oxygen partially reacts to produce a desired percentage of ozone. This ozone containing gas is then fed into the reactors where it bleaches the pulp.

In such an ozone recycle loop, tight control of flow rates, pressures and compositions of the gas recycle stream are necessary for optimum generator and reactor performance. Further, since electricity costs account for a large portion of the ozone production operating costs, maximum efficiency at the ozone generators is desirable. This efficiency, in turn, is a strong function of gas composition and temperature, and to a lesser extent pressure. As discussed in the above-mentioned patent application to Joseph et al., it has been found that a maximum concentration of 9% carbon dioxide (91% oxygen) is commercially feasible in that it allows the ozone generators to operate at an optimum efficiency. Thus, it is desirable to feed gas having a concentration as close to 91% oxygen as possible into the ozone generators and to minimize variation in the composition of this gas entering the ozone generators. Further, should an upset in oxygen composition occur, caused, for example, by a change in reactor demand, it is similarly important to provide a rapid return to set-point after such an upset.

As for the generator pressure, which as mentioned above effects generator efficiency, but to a lesser extent than gas composition, constant pressure at the ozone generators is desirable for two reasons. First, ozone generation efficiency is maximized at a specified pressure. Second, a constant generator pressure ensures constant head to the reactor control valves, simplifying the control action of those valves.

A strategy for controlling the gas recycle loop to meet the above-described goals has been developed wherein spent gas is compressed and then passed through a thermal and catalytic destruct sequence to convert residual ozone, hydrocarbons and carbon monoxide to carbon dioxide and water. The gas is cooled, and a purge stream taken to prevent the accumulation of carbon dioxide. The gas is then refrigerated and dried in an absorption unit to remove all water. Oxygen is then added to bring the gas to its desired composition. The oxygen containing gas then passes to an ozone generator where the oxygen partially reacts to produce a predetermined percentage by weight of ozone. This ozone containing gas then flows to the reactors where it bleaches the pulp.

This control scheme includes a pressure control valve, driven by a controller, which maintains constant pressure at the generators. This system thereby largely solves the problem of maintaining generator pressure.

Further, in this control scheme, the purge rate of carbon dioxide is controlled based on the oxygen composition of the gas entering the ozone generator. The flow rate of added oxygen is based on ozone generator pressure. While it has been found that this strategy keeps the oxygen content of the gas entering the ozone generator within an acceptable range, the response time for return to set-point, i.e., 91% oxygen, after a change in flow rate through the recycle loop is relatively slow and thereby reduces generator efficiency. Thus, when reactor demand changes, the above-described system is slow to re-establish the proper oxygen composition.

Therefore, it is desirable to design a control strategy that provides minimal variation in oxygen composition and a rapid return to the set-point after an upset.

SUMMARY OF THE INVENTION

It is therefore an object of the present invention to operate an ozone recycle system in a pulp bleaching process in a manner which utilizes the full generation capacity of the ozone generator. In particular, the method provides for maintaining constant pressure at the ozone generators as well as providing for constant oxygen composition of the gas entering the generators. Additionally, the method provides for rapid return to set-point in case of upset in the oxygen composition being delivered to the ozone generators.

A preferred embodiment teaches a system that includes controlling five feedback loops that strongly interact. The invention is a strategy that successfully allows control of this complex system.

The method includes an ozone gas recycle loop wherein an ozone generator produces an ozone containing gas from an oxygen containing feed gas and delivers said ozone containing gas to an ozone reactor at a variable flow rate responsive to reactor demand.

The flow rate of the ozone containing gas fed to the ozone reactor is varied in response to various process conditions including incoming pulp brightness, K No. and tonnage, outgoing pulp brightness and desired brightness or K No. Pulp is bleached with the ozone containing gas, thereby producing an exhaust gas having a flow rate that varies in response to the flow rate of the ozone containing gas delivered to the ozone reactor. The exhaust gas is then captured and an amount equivalent to reactor demand is returned to the recycle loop.

In a preferred embodiment, the oxygen content of the oxygen containing feed gas is monitored at or near the inlet of the ozone generator and an amount of fresh oxygen is supplied to the oxygen containing feed gas to obtain a predetermined level of oxygen.

Additionally, an amount of exhaust gas is purged at a rate substantially equivalent to the rate fresh oxygen is supplied. However, the pressure at the ozone generator is also monitored and the purge rate is adjusted in order to maintain constant pressure at the ozone generator. Thus, the purge rate is based on two inputs, oxygen addition rate and generator pressure. This provides a rapid return to set-point after a variation in oxygen composition and advantageously, also maintains constant generator pressure.

In the preferred embodiment, a compressor, having its output split between the recycle loop and a bypass loop connected to the compressor inlet is employed to match compressor demand to the flow of exhaust gas to the recycle loop. By maintaining a predetermined constant pressure at the compressor inlet, such a result can be obtained.

Constant pressure at the compressor inlet is achieved by measuring the pressure at the compressor inlet, detecting a deviation from the constant predetermined pressure and adjusting the flow through the bypass loop to return the pressure at the compressor inlet to its constant predetermined value.

Furthermore a pressure control valve with dryer pressure as its input variable is controlled to maintain constant pressure at the dryer system of the present invention.

BRIEF DESCRIPTION OF THE DRAWINGS

A more complete understanding of the invention may be obtained by reading the following description in conjunction with the appended drawings in which.

DETAILED DESCRIPTION OF THE PREFERRED EMBODIMENT

Figure 1:
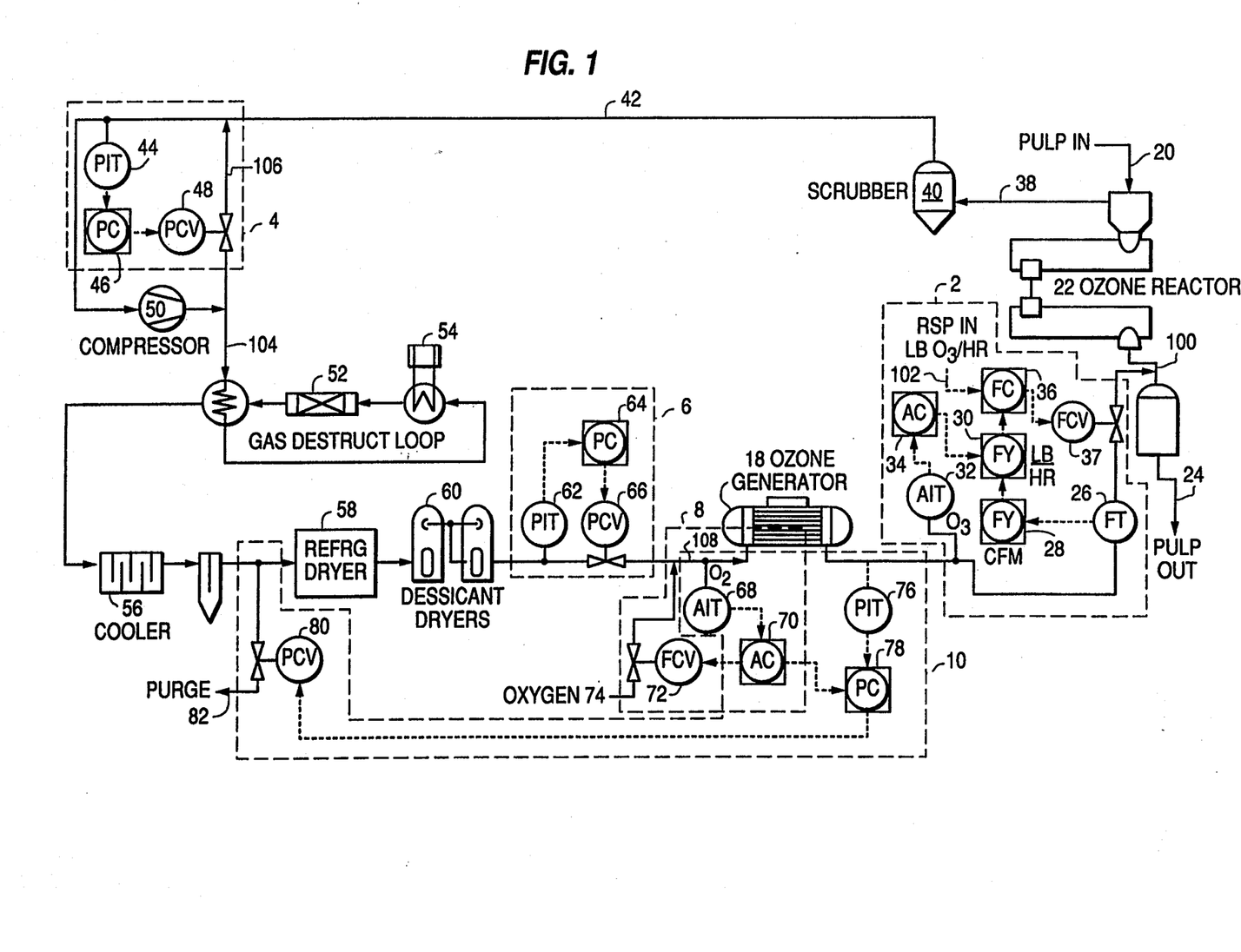
FIG. 1 is a process flow diagram of the preferred process control of the present invention.

FIG. 1 illustrates a preferred embodiment of the present invention wherein an ozone bleaching process and its associated gas recycle loop are shown comprised of five feedback loops: a reactor flow control loop 2, a compressor bypass control loop 4, a dryer pressure control loop 6, an oxygen addition control loop 8 and a purge control loop 10. As will be discussed in detail below, the first four of these loops consist of stand-alone control algorithms, while the fifth loop, i.e., the purge control loop 10, is cascaded to the oxygen addition control loop 8.

In the system shown in FIG. 1, pulp 20 and an ozone containing gas 100 are supplied to an ozone reactor 22. A suitable ozone reactor is described in commonly-assigned, copending U.S. application Ser. No. 07/604,849, U.S. Pat. No. 5,181,989, to White et al. entitled "Pulp Bleaching Reactor and Method," filed Oct. 26, 1990, the disclosure of which is expressly incorporated herein by reference thereto. In the ozone reactor 22, the pulp 20 is bleached by the ozone containing gas 100 thereby producing bleached pulp 24 and an exhaust gas 38. The exhaust gas 38 is then recycled for removal of contaminants. A system for removing contaminants, including carbon dioxide, from an ozone generation recycle stream is disclosed in commonly-assigned, copending U.S. application Ser. No. 07/739,050 to Joseph et al. filed Aug. 1, 1991 entitled "Process and Apparatus for Conditioning Ozone Gas Recycle Stream in Ozone Pulp Bleaching."

The over-riding control constraint of the system is to precisely match ozone production and application to the brightness or K No. and tonnage of the incoming pulp 20 and the desired brightness of the outgoing pulp 24. It has been found that the best way to accomplish this result is by keeping the ozone concentration of the ozone containing gas 100 at an economically optimum level of 6 wt % and varying the flow rate of the ozone containing gas 100 to provide the desired amount in the reactor to meet the bleaching requirements.

Although not shown in the figures, in order to determine the amount of ozone required by the reactor 22, the brightness and tonnage of the incoming pulp 20 are monitored continuously. Feedback of the brightness of the exiting pulp 24 fine tunes the ozone application level. The above-mentioned information along with the desired brightness of the outgoing pulp 24, are used to determine the lb/hr of ozone needed to bleach the incoming pulp to the desired brightness. The lb/hr required by the reactor, or the set-point, is delivered to the system of the present invention via signal 102. The set-point is continually changing due to changes in the incoming pulp 20. For example, if the brightness of the incoming pulp 20 decreases or the tonnage increases, the ozone requirement of the reactor will increase.

In order to determine whether the reactor 22 is being supplied with the required amount of ozone, the pounds per hour of ozone actually being delivered to the reactor 22 is also calculated. The volumetric flow of gas entering the reactor 22 is determined by a flow transmitter 26. This is converted to cubic feet per minute by conventional calculation means 28. The ozone gas concentration is also monitored via analyzer indicator transmitter 32. The flow of ozone containing gas in cubic feet per minute from calculation means 28 and the percentage ozone in the ozone containing gas via controller 34 are used to determine the actual lb/hr of ozone being delivered to the reactor by conventional calculating means 30.

The necessary flow rate is then delivered by a flow control valve 37 upstream of the reactor 22. The action of the valve 37 is controlled by a stand alone, integral only controller 36 with short time constant, using the gas flow rate as the measured variable.

The transmitters (sensors), e.g., flow transmitter 26; calculation means, e.g., calculation means 28, controllers, e.g., flow controller 36; and valves, e.g., flow control valve 37, discussed throughout the present invention are commercially available and will be understood by those skilled in the art.

Figure 2A:
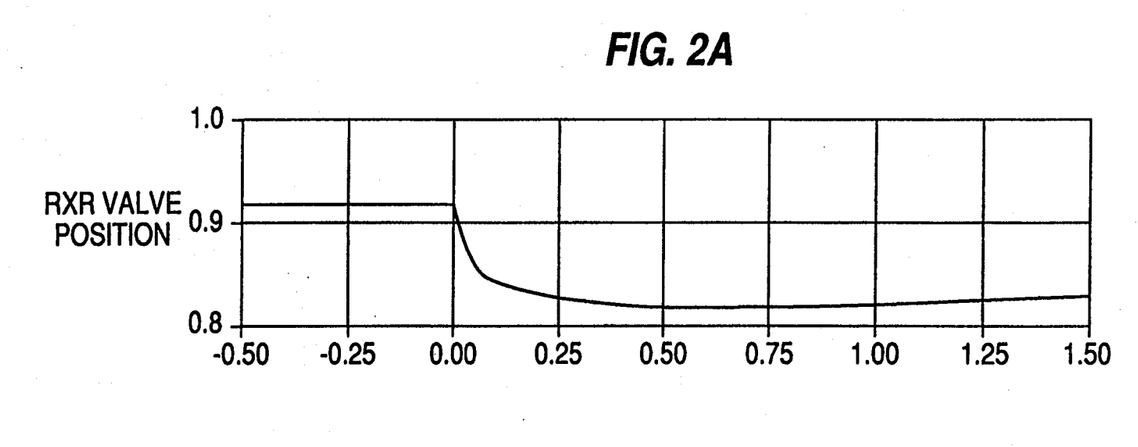
FIG. 2A is a graph plotting change in reactor flow valve position required by a 20% step reduction in reactor demand.
Figure 2B:
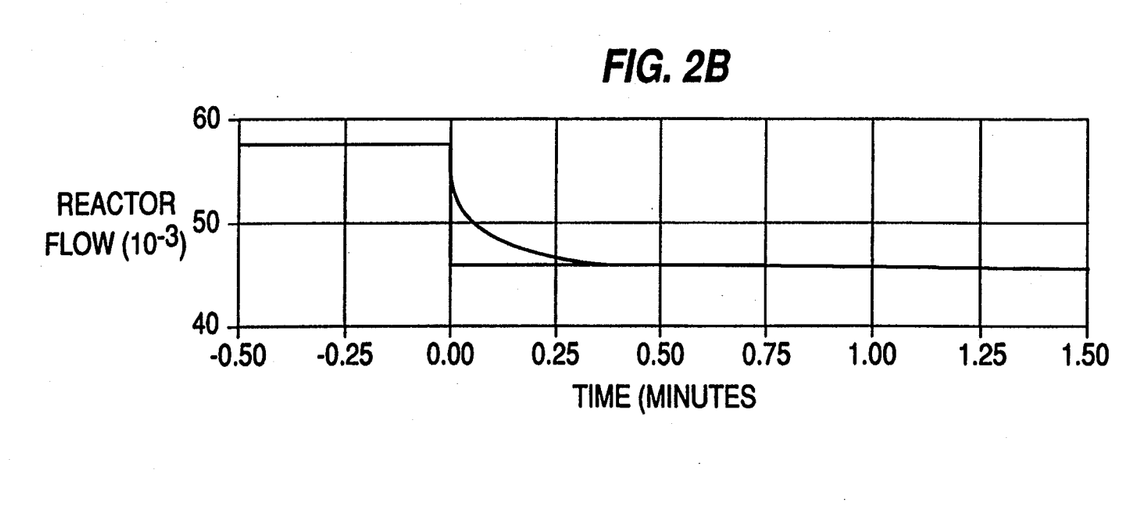
FIG. 2B is a graph of the actual predicted flow rates to the reactor upon a 20% step reduction in reactor demand.

FIGS. 2A and 2B illustrate a simulated reactor flow response. The curve in FIG. 2A shows the change in valve 37 position required by a 20% step reduction in reactor demand. As illustrated, since the ozone percentage of the gas is constant, a decrease in reactor demand causes the controller 36 to close valve 37 and reduce the flow rate to the reactor 22 since a lesser amount of ozone is required to achieve the desired bleaching of the pulp. Such a reduction in reactor demand could be caused, for example, by a decrease in the amount of pulp supplied to the reactor or an increase in the brightness of the pulp supplied to the reactor. The curve in FIG. 2B is the actual predicted flow rate to the reactor 22. As can be observed, this curve almost exactly matches the demand. In particular, the response time required to reach within 1% of the new set-point is only about 10 seconds. As a result, the over-riding control constraint of the system, i.e., to precisely match ozone production and application to the brightness and tonnage of the incoming pulp, is met.

Referring again to FIG. 1, after bleaching, the exhaust gas is directed to a counter-current scrubber 40. Counter-current scrubber 40 uses water as a scrubbing material to remove entrained pulp fibers from the exhaust gas. The operation of a counter-current scrubber in this manner will be understood by persons of ordinary skill in the art.

After scrubber 40, the exhaust gas pressure is boosted by a compressor 50. Pumping rate through the compressor 50 is a strong function of rotations per minute (rpm) and inlet (suction) pressure, but is only weakly dependent upon the outlet pressure. Further, the principal constraint on inlet pressure is that it must stay above atmospheric pressure to avoid surging (transient backflow of gas) which can damage the compressor 50. Such a compressor is commercially available and understood by persons skilled in the art.

The compressor 50 of the present invention is designed to pump at a nearly constant volume of gas. At constant rpm and constant suction pressure, the compressor will deliver a nearly constant volume of gas to the output. The compressor output is split into two streams 104 and 106. One stream 104 contains a major portion of the outlet gas and is delivered to the process loop to meet the demands of the reactor 22. The remaining portion 106 is passed through a bypass loop and returned to the compressor suction.

The bypass loop portion 106 is responsible for matching flow rate through the gas recycle loop portion 104 to the reactor 22 demand. A pressure control valve 48 on the bypass loop maintains constant suction pressure at the compressor inlet and thereby matches the compressor output to the recycle loop to the demand of the ozone containing gas to the reactor. Thus, when ozone demand decreases, decreasing flow into the reactor and similarly decreasing reactor exhaust, a drop in pressure at the compressor inlet will be created. Such a drop is countered by the opening of valve 48 to increase bypass flow and maintain constant pressure at the compressor inlet. The action of this valve 48 is controlled by a stand-alone proportional plus integral (PI) controller 46 using the compressor inlet pressure measured by a pressure indicator transmitter 44 as the measured variable.

Figures 3A, 3B:
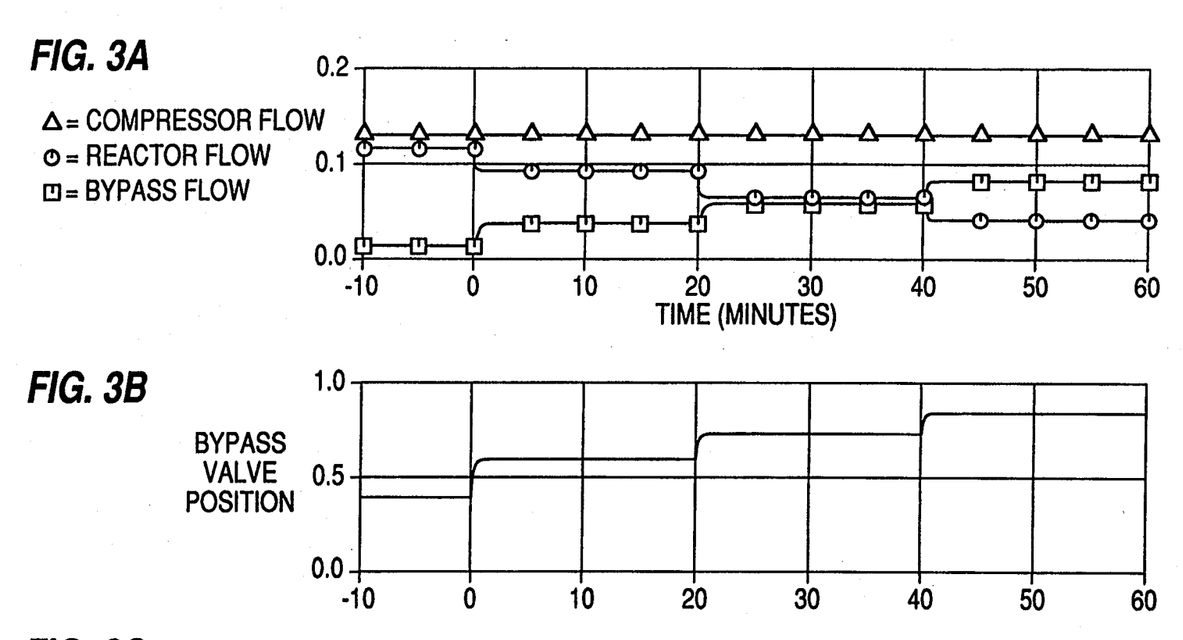
FIG. 3A is a graph plotting compressor flow, reactor flow and bypass flow versus time for successive 20% step decreases in reactor demand.
FIG. 3B is a graph plotting bypass valve position for successive 20% step decreases in reactor demand.
Figure 3C:
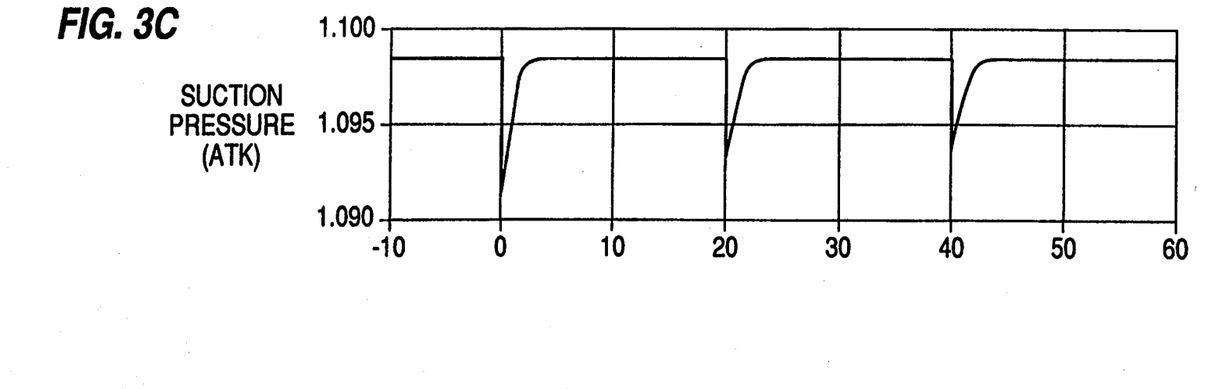
FIG. 3C is a graph plotting suction pressure at the compressor for successive 20% step decreases in reactor demand.

Simulated compressor bypass flow and pressure responses are shown in FIGS. 3A, 3B and 3C. FIG. 3A shows successive 20% decreases in reactor demand at t=0, 20 and 40 minutes and the resulting increase in bypass flow to maintain constant flow at the compressor 50. As discussed above, a decrease in reactor demand causes the reactor flow valve 37 to decrease flow to the reactor 22. This in-turn decreases reactor exhaust 38 exiting the reactor. Since the gas flow rate through the compressor 50 is constant, step reductions in flow rate leaving the reactor cause a drop in pressure at the compressor inlet. This drop is measured at 44, and the controller 46 opens the bypass valve 48 to compensate. The position of bypass valve 48 is as shown in FIG. 3B.

The opening of valve 48 increases the flow diverted through bypass loop 106 as shown in FIG. 3A until the sum of flow rates through the bypass loop and from the reactors again matches the compressor pumping rate. As a result, the net effect is to exactly match the rate of gas entering the recycle loop 104 with the decreased rate which is directed to the reactor 22. FIG. 3A shows that compressor flow remains constant following successive changes in reactor flow. As the reactor flow decreases, the bypass valve opens, thereby rapidly increasing bypass flow and reducing the flow to the reactor 22.

FIG. 3C shows the anticipated suction pressure response at the compressor 50, with deviations of less than 0.1 psi expected, and fully damped return to set-point in less than about 2 minutes. Thus, the suction pressure at the compressor rapidly stabilizes in response to closing of the bypass valve 48. Such a rapid, stable response of the control loop is critical to obtaining rapid response in the remainder of the system.

Referring again to FIG. 1, upon exiting the compressor 50, exhaust gas that does not pass through the bypass loop 106 and back to the compressor inlet, is directed through thermal destruct 54 and catalytic destruct 52 units for initial contaminant removal. Again, these components are commercially available and understood by persons skilled in the art. Thermal be destruct unit 54 removes a portion of the carbon monoxide generated by the bleaching process and residual unused ozone. Residual ozone exiting the reactor is considered a contaminant because it may be directed back into the recycle stream dryer or released to the atmosphere. Catalytic destruct unit 52 eliminates hydrocarbons and any remaining carbon monoxide.

After the destruct sequence, the recycle gas is cooled in cooling unit 56 to condense and remove water.

The carbon dioxide level in the system is controlled by purging a portion of recycle gas at purge control valve 80. The purged portion forms purge gas 82. The control of the purge valve 80 will be discussed in detail below.

After purge 82, cooled recycle gas is directed to refrigerator 58 and then to desiccant drier 60. The desiccant drier 60 uses silica gel and molecular sieve material to eliminate moisture and produce dried recycle gas. Cooling unit 56, refrigerator 58 and desiccant drier 60, are also commercially available components which operate in a known manner, as would be understood by those skilled in the art.

Since even trace amounts of water will have a severely detrimental impact on ozone generation efficiency, the multistage (cooler, refrigerator, desiccator) drying system described above is necessary. Such a system ensures that the gas entering the ozone generators 18 is free of moisture.

One of the design variables in sizing the drying system is pressure, which directly influences residence time and mass transfer rates. It is desired, therefore, to maintain somewhat constant pressure in the drying system. This is accomplished by means of a pressure control valve 66 located just downstream from the desiccant dryers 60. Valve 66 is controlled by a stand-alone integral only controller 64, with upstream pressure via a pressure indicator transmitter 62 as the measured variable.

The natural pressure response at the dryer is as follows: On closure of the reactor flow control valve 37, the total resistance across the recycle loop (from compressor head to compressor suction) instantly increases. Gas flow rate into the loop does not instantaneously respond, but must wait for opening of the bypass control valve 48. This higher resistance at the same flow rate causes a transient increase in pressure at the dryers 60. However, once the bypass valve 48 begins to open and flow through the recycle loop decreases, the pressure head at the compressor 50 falls. The reduction in pressure head is also accompanied by a reduction in pressure drop between the compressor 50 and dryer 60. The two changes are of roughly the same magnitude, and nearly cancel each other. However, the final response at the dryer 60 is a net reduction in pressure. This drop in pressure is countered by closing the pressure control valve 66 downstream from the dryer 60.

Figure 4A:
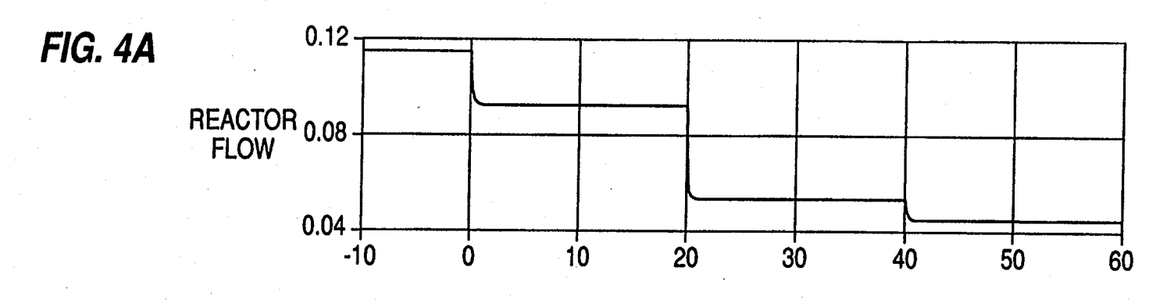
FIG. 4A is a graph plotting successive 20% decreases in flow demand to the reactor.
Figure 4B:
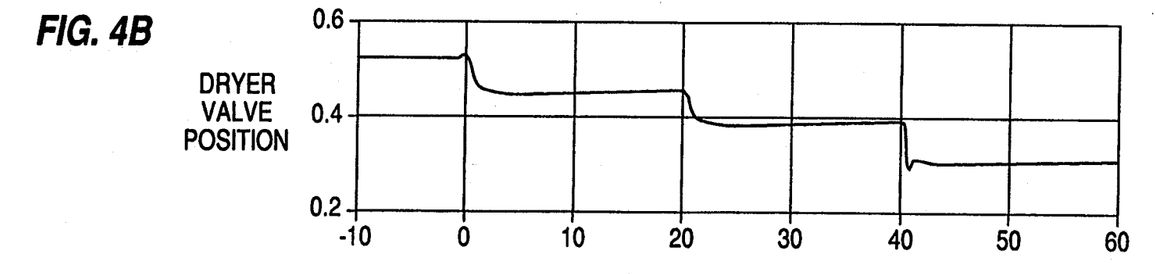
FIG. 4B is a graph plotting dryer valve position for successive 20% decreases in reactor flow demand.
Figure 4C:
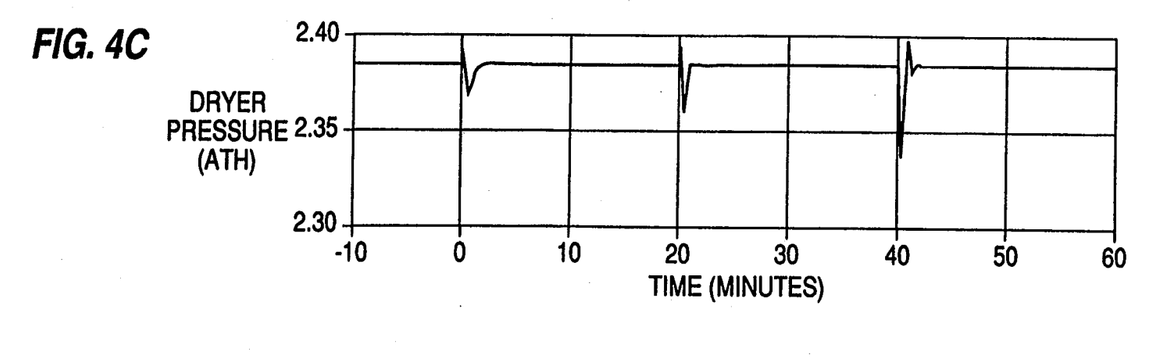
FIG. 4C is a graph plotting dryer pressure for successive 20% decreases in reactor flow demand.

A plot of dynamic valve action and dryer pressure response is shown in FIGS. 4A, 4B and 4C. FIG. 4A again shows sequential 20% step drops in flow demand to the reactor 22 at t=0, 20 and 40 minutes. In response to decreased reactor demand, there is a transient increase in pressure at the dryer 60 indicated by the peaks shown at t=0, 20 and 40 minutes of FIG. 4C. As the bypass valve 48 opens, the pressure at the dryer 60 decreases. In response to the decreasing dryer pressure, the pressure control valve 66 closes as shown in FIG. 4B. As shown in FIG. 4C, by such action, the variations in dryer pressure can be kept to less than 1 psi.

It should be noted that just the opposite response takes place at the dryers upon opening of the flow control valve 37 (caused by increased reactor demand). The bypass valve 48 closes increasing flow into the recycle loop and resulting in a net increase in pressure at the dryer 60. This increase in pressure is countered by opening the pressure control valve 66 downstream from the dryer 60.

As discussed above, high levels of carbon dioxide have been shown to lower the efficiency of the ozone generators 18. For this reason, fresh oxygen must be added to the recycle loop, and carbon dioxide must be purged as described above. As discussed in the above-referenced patent to Joseph et al., a maximum $CO_2$ concentration of 9% has been found to be commercially feasible in that it allows the ozone generators to operate at a high enough efficiency.

To insure that no more than 9% $CO_2$ enters the generators, it is necessary that the gas stream entering the ozone generator 18 be composed of at least 91% of oxygen. While this requirement could be met by adding an excess of pure (i.e. 95-99%) oxygen to the recycle stream, such a solution would result in increased cost due to the higher raw material consumption.

Alternatively, oxygen addition may be controlled via a stand-alone proportional integral controller (PI) 70 with the oxygen content of the oxygen containing feed gas 108 entering generator 18 as the measured variable. As seen in FIG. 1, an analyzer indicator transmitter 68 supplies the controller 70 with the composition of oxygen entering the generator 18. The controller 70, in-turn, adjusts the flow of oxygen into the system via flow control valve 72 such that the desired 91% requirement is satisfied.

By monitoring oxygen content directly below the junction with the main recycle loop dead time is minimized and a rapid response to changing conditions is possible.

Figure 5A:
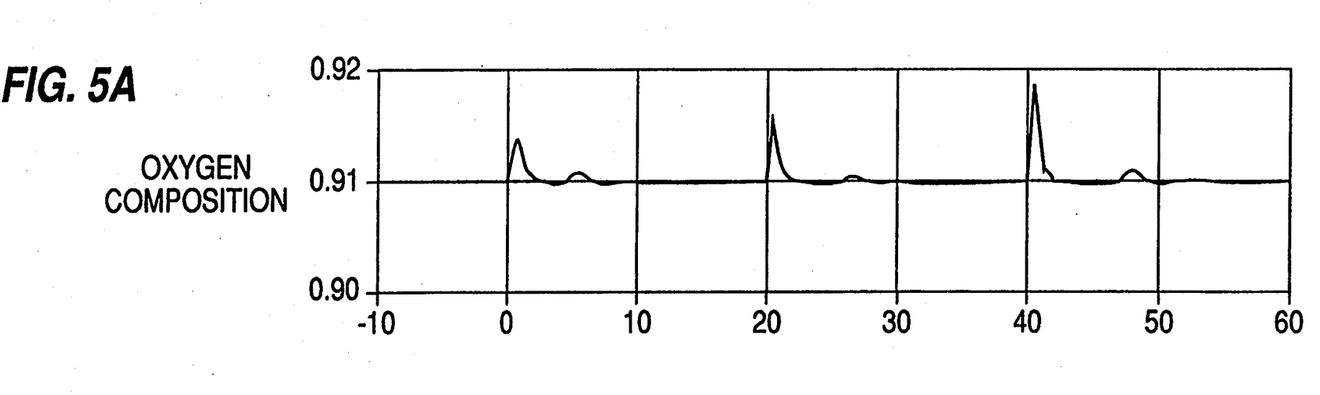
FIG. 5A is a graph plotting oxygen composition entering the ozone generator for successive 20% decreases in reactor demand.
Figure 5B:
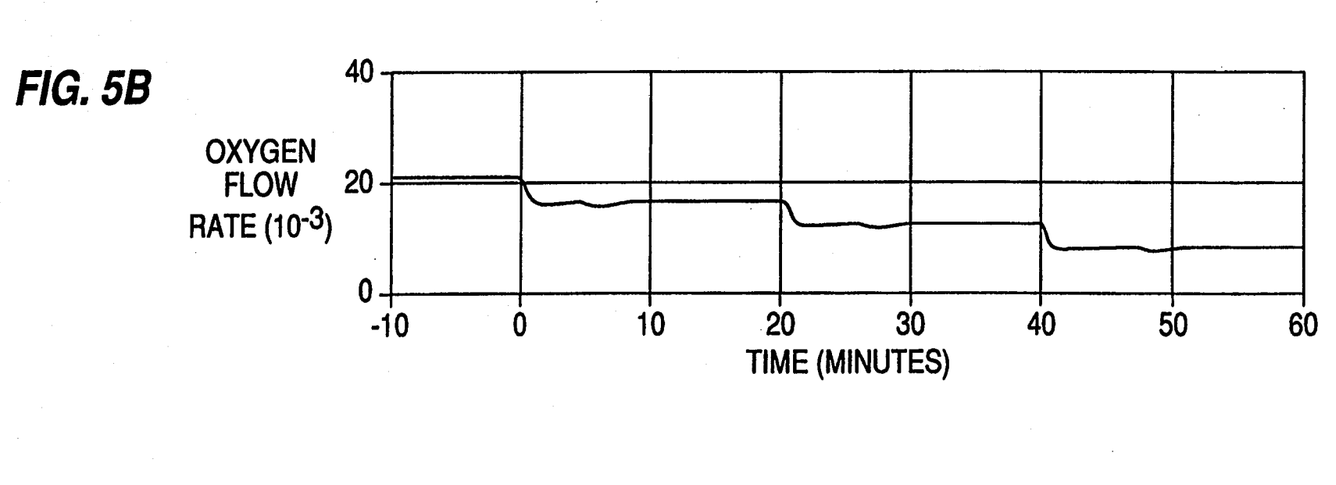
FIG. 5B is a graph plotting fresh oxygen flow rate for successive 20% decreases in reactor demand.

FIGS. 5A and 5B show oxygen composition and oxygen flow, respectively, in response to successive 20% decreases in reactor demand occurring at t=0, 20, 40 minutes. As can be observed from FIG. 5B, the system's oxygen requirement decreases as reactor demand decreases. Satisfying this decreased demand is accomplished by reducing the flow of fresh oxygen via closure of valve 72. As shown in FIG. 5A, the transient deviations in oxygen composition are kept to less than 1%, with stable return to set-point in less than about three minutes.

To maintain an overall mass balance, the purge rate must match the rate of oxygen addition. Although the oxygen flow rate could be measured and control of the purge valve 80 matched to that rate, errors would inevitably build over time, resulting in a net increase or decrease in overall system pressure. Thus, the present invention employs pressure to detect differences in gas flow rate. Pressure is proportional to the integral of flow rate, so small differences in purge and addition rates will become evident over time. This approach has the added advantage that it provides control of an additional system parameter, in this case, pressure at the ozone generators. As stated earlier, maintaining constant pressure at the generators is desirable to maximize their efficiency.

Figure 6A:
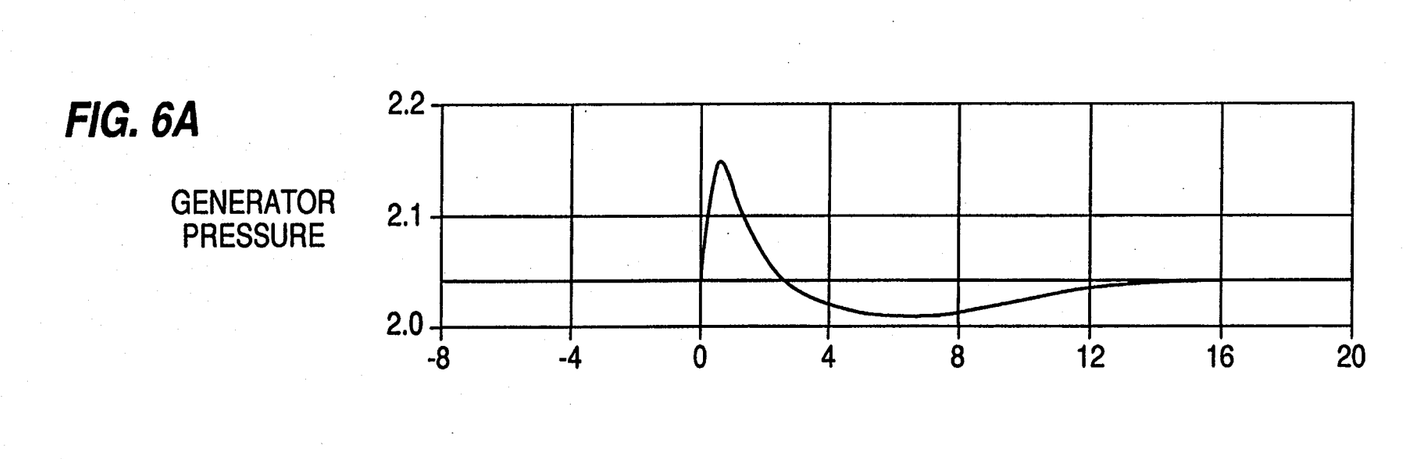
FIG. 6A is a graph plotting generator pressure in response to a 20% decrease in reactor demand.

The natural pressure response at the generators 18, on turndown, is to increase. This increase arises from two factors. Initially, when the reactor flow control valve 37 closes, but before the bypass flow via 106 has had time to adjust, the flow into the generators 18 is greater than the flow out. This is a transient effect, which is quickly corrected by the compressor bypass loop 4. The second cause results from the lower flow rate across the pressure control valve 66 at the dryers 60. As noted above, the dryer pressure is being held constant, so reducing the flow rate through valve 66 reduces the pressure drop and increases the downstream pressure at the generators 18. FIG. 6A shows the increase in generator pressure upon a 20% step decrease at t=0 in reactor demand.

In the present invention, the pressure at the ozone generators 18 is monitored via pressure indicator transmitter 76. A pressure controller 78 senses changing pressure conditions and controls a purge valve 80 to maintain pressure constant. This loop, however, is not a conventional single-input-single-output loop, but is also cascaded to the position of the oxygen flow control valve.

A single input controller based on pressure alone would yield the following response on turndown: As noted above, the generator pressure would increase on turndown. Simultaneously, the oxygen addition rate would drop. A single input controller based on pressure would call for an increase in purge rate to counter the increased pressure. This is precisely, the opposite of the desired response. The desired response would be to substantially match the decreasing oxygen addition rate caused by turndown with a decreasing purge rate. To make matters worse, this loop is the most sluggish in the entire control system as it is attempting to control the pressure of a relatively large volume (⅜ of the total loop) by adjusting the flow rate of a small stream.

Therefore, the desired operation of the purge control valve 80 is cascaded to oxygen addition and operates to nearly match the rate of oxygen addition, but to allow slightly higher purge if the generator pressure is high, and slightly lower purge if the generator pressure is low.

Hence, by cascading the positions of the oxygen and purge controllers the desired response can be achieved. Thus, when the oxygen flow control valve shuts down, it brings the purge valve with it. The difference between these two valve positions is the quantity controlled by the purge control loop 10. On turndown, therefore, the purge rate will also drop, but not as far nor as fast as the oxygen rate. The two flows will match each other again when the generator pressure has been brought back to its set-point. With this strategy, the generator pressure can be controlled to within less than 2 psi.

Figure 6B:
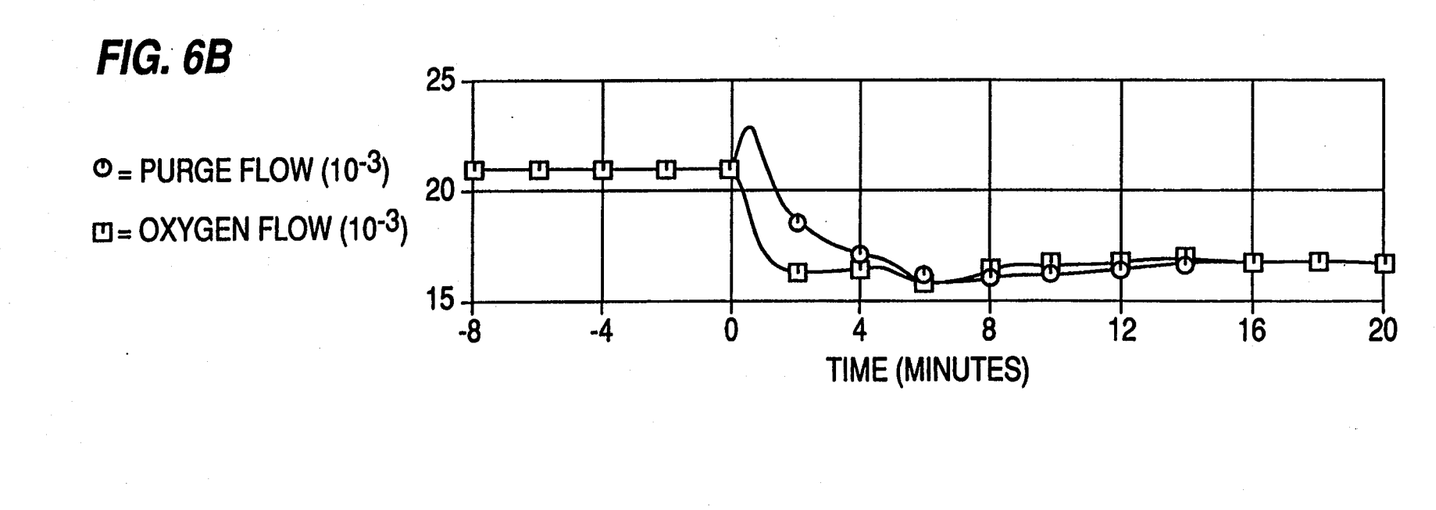
FIG. 6B is a graph plotting purge flow rate and fresh oxygen flow rate for a 20% decrease in reactor demand.

FIG. 6B shows that at turndown, the oxygen demand of the system decreases. The purge rate, responding to pressure, initially increases. As noted above, this is exactly opposite the desired response. However, as can be observed, this is quickly correctly by cascade control with the oxygen addition rate. A single input controller based on pressure alone would not make this correction.

An example of overall system response would be as follows:

If pulp tonnage increases, or the brightness falls of incoming pulp 20, the control algorithm will call for increased ozone flow to the reactors, and the reactor flow control valve 37 will open. Flow through the reactor 22 will increase, causing a simultaneous increase in pressure at the compressor 50 suction and decrease in pressure at the generators 18. The pressure rise at the compressor suction will be countered by restriction of the bypass valve 48, which will reduce bypass flow, and increase the flow through the recycle loop. Increased flow through the recycle loop will increase dryer pressure and result in the opening of dryer pressure control valve 66 to stabilize dryer pressure. The increased reactor flow will also result in greater oxygen consumption and $CO_2$ generation. This will cause a drop in the measured oxygen concentration, which will be countered by opening the oxygen control valve 72 and increasing the make-up oxygen flow rate. The increase in oxygen flow rate causes a corresponding increase in purge rate. However, increasing the flow rate through dryer pressure control valve 66 increases the pressure drop across the valve and reduces the downstream pressure at the generator 18. As a result, the purge rate is slightly decreased to stabilize generator pressure.

It is understood that various other modifications will be readily apparent to those skilled in the art without departing from the scope and spirit of this invention. Accordingly, it is not intended that the scope of the claims appended hereto be limited to the description set forth herein, but rather that the claims be construed as encompassing all the features of patentable novelty that reside in the present invention, including all features that would be treated as equivalents thereof by those skilled in the art to which this invention pertains.

What is claimed is:

1. A method for controlling an ozone gas recycle loop in an ozone bleaching process wherein an ozone generator produces an ozone containing gas from an oxygen containing feed gas and delivers said ozone containing gas to a plug flow reactor at a variable flow rate for reaction with pulp, the method comprising the steps of:

determining ozone demand of said plug flow reactor based on pulp condition and flow rate;

varying the flow rate of said ozone containing gas to said reactor in response to said ozone demand;

bleaching the pulp in the reactor with said ozone containing gas, thereby producing an exhaust gas containing contaminants including carbon dioxide, said exhaust gas having a flow rate that varies in response to the flow rate of the ozone containing gas to the ozone reactor;

recovering said exhaust gas and returning said gas to the ozone generator to form an ozone gas recycle loop;

modifying the flow rate of said exhaust gas into and within said recycle loop so that the flow rate of the exhaust gas returned to the ozone generator substantially conforms to the ozone demand of said reactor;

providing a dryer system in said recycled loop to remove moisture from said exhaust, gas:

maintaining a predetermined constant pressure at said dryer system in response to the reactor demand;

detecting a change from the constant predetermined pressure at the dryer system caused by the adjustment of flow through the bypass loop of the compressor;

adjusting a pressure control valve downstream from the dryer system to return the pressure at the dryer system to its predetermined value;

monitoring the oxygen content of the oxygen containing feed gas at or near the inlet of the ozone generator;

supplying an amount of fresh oxygen to the oxygen containing feed gas at a rate sufficient to obtain said predetermined oxygen composition;

purging an amount of exhaust gas at a rate substantially equivalent to the rate of fresh oxygen supplied;

detecting a change in pressure at the ozone generator from a constant predetermined pressure caused by the adjustment of flow through the pressure control valve downstream of the dryer system; and adjusting the purge rate in order to maintain constant pressure at the ozone generator;

wherein said step of modifying the flow rate of said exhaust gas into and within said recycle loop includes the steps of providing a compressor in said recycle loop, and maintaining a predetermined constant pressure at the compressor inlet in response to the varying flow rate of said exhaust gas by diverting a variable portion of the compressor output back to the compressor inlet.

2. The method according to claim 1, further comprising the step of:

recirculating a portion of said exhaust gas within said recycle loop so that the flow rate of the exhaust gas returned to the ozone generator substantially matches the varied flow rate of the ozone containing gas to the reactor.

3. The method according to claim 2 further comprising the steps of:

monitoring the pressure at the ozone generator; and purging an amount of exhaust gas at a rate determined by the fresh oxygen supply rate and the pressure at the ozone generator.

4. The method according to claim 1, further comprising the steps of:

removing carbon dioxide from said exhaust gas in an amount sufficient to allow operation of the ozone generator at or approaching full capacity; and maintaining the oxygen content of the oxygen containing feed gas at a predetermined level.

5. The method according to claim 1 wherein said predetermined oxygen content of the feed gas is at least about 91%.

6. The method according to claim 5 which further comprises the step of:

controlling transient deviations in oxygen content of the feed gas at less than one percent.

7. The method according to claim 1 which further comprises the step of:

controlling the pressure at the ozone generator within less than about 2 pounds per square inch.

8. The method according to claim 1 which further comprises the step of:

providing the ozone containing gas with an ozone concentration of about 3-10 wt. %.

9. The method according to claim 1 wherein said ozone demand represents the ozone requirement of the reactor and is a function of at least one parameter, including one or more of incoming pulp brightness, incoming pulp flow rate or outgoing pulp brightness.

10. The method according to claim 1 wherein said ozone demand represents the ozone requirement of the reactor and is a function of at least one parameter, including one or more of incoming pulp K No., incoming pulp flow rate or outgoing pulp K No.

11. The method according to claim 1 wherein the step of varying the flow rate of ozone containing gas to said reactor in response to said ozone demand includes:

measuring the flow rate of the ozone containing gas supplied to the ozone reactor;

measuring the ozone gas concentration in the ozone containing gas supplied to the ozone reactor;

calculating the amount of ozone actually being delivered to the reactor from the flow rate and the ozone concentration;

comparing the actual amount of ozone being delivered to the reactor to the ozone demand; and adjusting the flow rate of ozone containing gas supplied to the reactor such that actual amount of ozone being delivered to the reactor is substantially equivalent to the ozone demand of the reactor.

12. The method according to claim 11 wherein the steps of comparing and adjusting are accomplished by a flow control valve located upstream of said reactor controlled by an integral only controller.

13. The method according to claim 11 wherein the step of adjusting requires 10 seconds or less to reach within 1% of a changed reactor ozone demand in response to a change of about 20% or more of ozone demand.

14. The method according to claim 1 wherein the diverted portion of the compressor output returns to the compressor inlet through a bypass loop.

15. The method according to claim 1 further comprising the steps of:

measuring the pressure at the compressor inlet;

detecting a deviation from the constant predetermined pressure at the compressor caused by changing ozone demand; and adjusting the flow through the bypass loop to return the pressure at the compressor inlet to its constant predetermined value.

16. The method according to claim 15 wherein the steps of detecting and adjusting are accomplished by a pressure control valve controlled by a proportional plus integral controller.

17. The method according to claim 1 wherein the drying system includes a cooler, a refrigerator and a desiccator and is located downstream from the compressor.

18. The method according to claim 1 wherein an integral only controller controls the action of the pressure control valve of the dryer system.

19. The method according to claim 1 which further comprises the steps of:

treating at least a portion of said exhaust gas to remove contaminants therefrom.

20. The method according to claim 19 wherein the contaminants are removed by purging or destruction prior to returning said exhaust gas to the ozone generator.

* * * * *